United States Patent [19]

Ware

[11] Patent Number: 4,495,593

[45] Date of Patent: Jan. 22, 1985

[54] MULTIPLE BIT ENCODING TECHNIQUE FOR COMBINATIONAL MULTIPLIERS

[75] Inventor: Frederick A. Ware, Los Altos Hills, Calif.

[73] Assignee: Hewlett-Packard Company, Palo Alto, Calif.

[21] Appl. No.: 394,234

[22] Filed: Jul. 1, 1982

[51] Int. Cl.³ .............................................. G06F 7/50
[52] U.S. Cl. ................................................... 364/757
[58] Field of Search .............. 364/758, 759, 757, 786, 364/787, 200 MS File, 900 MS File

[56] References Cited

U.S. PATENT DOCUMENTS 4,110,832 8/1978 Leininger et al. ................. 364/786
4,122,527 10/1978 Swiatowiec ........................ 364/787

OTHER PUBLICATIONS

A. Booth, "A Signed Binary Multiplication Technique", Quarterly Journal of Mechanics and Applied Mathematics, vol. IV, pt. 2, pp. 236–240, (1951).

Primary Examiner—Gareth D. Shaw
Assistant Examiner—Tim A. Wiens
Attorney, Agent, or Firm—Jeffery B. Fromm

[57] ABSTRACT

A four member encoding set is disclosed which allows the construction of combinational monolithic multipliers with a significant reduction in the number of devices required. The reduced device and wire count in the present technique allows a multiplier circuit of any given size to be made less expensively or alternatively allows a larger precision multiplier to be constructed.

5 Claims, 9 Drawing Figures

|  |  | 8 BIT UNSIGNED A OPERAND → | | | | | | | | | | | | | | | |
|---|---|---|---|---|---|---|---|---|---|---|---|---|---|---|---|---|---|
| IF B(0) = 1 THEN + | 0 | 0 | 0 | 0 | 0 | 0 | 0 | 0 | A(7) | A(6) | A(5) | A(4) | A(3) | A(2) | A(1) | A(0) | PARTIAL PRODUCTS |
| IF B(1) = 1 THEN + | 0 | 0 | 0 | 0 | 0 | 0 | 0 | A(7) | A(6) | A(5) | A(4) | A(3) | A(2) | A(1) | A(0) | 0 | |
| IF B(2) = 1 THEN + | 0 | 0 | 0 | 0 | 0 | 0 | A(7) | A(6) | A(5) | A(4) | A(3) | A(2) | A(1) | A(0) | 0 | 0 | |
| IF B(3) = 1 THEN + | 0 | 0 | 0 | 0 | 0 | A(7) | A(6) | A(5) | A(4) | A(3) | A(2) | A(1) | A(0) | 0 | 0 | 0 | |
| IF B(4) = 1 THEN + | 0 | 0 | 0 | 0 | A(7) | A(6) | A(5) | A(4) | A(3) | A(2) | A(1) | A(0) | 0 | 0 | 0 | 0 | |
| IF B(5) = 1 THEN + | 0 | 0 | 0 | A(7) | A(6) | A(5) | A(4) | A(3) | A(2) | A(1) | A(0) | 0 | 0 | 0 | 0 | 0 | |
| IF B(6) = 1 THEN + | 0 | 0 | A(7) | A(6) | A(5) | A(4) | A(3) | A(2) | A(1) | A(0) | 0 | 0 | 0 | 0 | 0 | 0 | |
| IF B(7) = 1 THEN + | 0 | A(7) | A(6) | A(5) | A(4) | A(3) | A(2) | A(1) | A(0) | 0 | 0 | 0 | 0 | 0 | 0 | 0 | |
|  | D(15) (MS) | D(14) | D(13) | D(12) | D(11) | D(10) | D(9) | D(8) | D(7) | D(6) | D(5) | D(4) | D(3) | D(2) | D(1) | D(0) (LS) | PRODUCT |

|  |  |  |  |  |  |  |  | 8 BIT SIGNED A OPERAND → |  |  |  |  |  |  |  |  |
|---|---|---|---|---|---|---|---|---|---|---|---|---|---|---|---|---|---|
| IF B(0)=1 THEN + | S | S | S | S | S | S | S | S | S | A(6) | A(5) | A(4) | A(3) | A(2) | A(1) | A(0) | PARTIAL PRODUCTS |
| IF B(1)=1 THEN + | S | S | S | S | S | S | S | S | A(6) | A(5) | A(4) | A(3) | A(2) | A(1) | A(0) | 0 | |
| IF B(2)=1 THEN + | S | S | S | S | S | S | S | A(6) | A(5) | A(4) | A(3) | A(2) | A(1) | A(0) | 0 | 0 | |
| IF B(3)=1 THEN + | S | S | S | S | S | S | A(6) | A(5) | A(4) | A(3) | A(2) | A(1) | A(0) | 0 | 0 | 0 | |
| IF B(4)=1 THEN + | S | S | S | S | S | A(6) | A(5) | A(4) | A(3) | A(2) | A(1) | A(0) | 0 | 0 | 0 | 0 | |
| IF B(5)=1 THEN + | S | S | S | S | A(6) | A(5) | A(4) | A(3) | A(2) | A(1) | A(0) | 0 | 0 | 0 | 0 | 0 | |
| IF B(6)=1 THEN + | S | S | S | A(6) | A(5) | A(4) | A(3) | A(2) | A(1) | A(0) | 0 | 0 | 0 | 0 | 0 | 0 | |
| IF B(7)=1 THEN + | S | S | A(6) | A(5) | A(4) | A(3) | A(2) | A(1) | A(0) | 0 | 0 | 0 | 0 | 0 | 0 | 0 | |
| IF B(7)=1 THEN − | S | A(6) | A(5) | A(4) | A(3) | A(2) | A(1) | A(0) | 0 | 0 | 0 | 0 | 0 | 0 | 0 | 0 | |
| | S(15) (MS) | A(6) D(14) | A(5) D(13) | A(4) D(12) | A(3) D(11) | A(2) D(10) | A(1) D(9) | A(0) D(8) | D(7) | D(6) | D(5) | D(4) | D(3) | D(2) | D(1) | D(0) (LS) | PRODUCT |

FIGURE 5'

| FIGURE 5B | FIGURE 5C |

FIGURE 5A

MULTIPLE BIT ENCODING TECHNIQUE FOR COMBINATIONAL MULTIPLIERS

BACKGROUND OF THE INVENTION

Several techniques have been devised for binary multiplication. One method is the binary equivalent of longhand multiplication. FIG. 1 shows how the multiplication of two unsigned 8-bit operands is performed with the binary equivalent of longhand multiplication. B(0) to B(7) are the digits of the B operand, A(0) to A(7) are the digits of the A operand, and D(0) to D(15) are the digits of the product D of B times A with A(0), B(0) and D(0) being the least significant digits (LS) and A(7), B(7) and D(15) being the most significant digits (MS), respectively.

For each 1 in the multiplier, operand B, a left shifted version of the multiplicand, operand A, is accumulated as a partial product. Thus the final sum of the partial products is the product D.

Often the operands are in "two's complement" format. This means that each one in the operand is converted to a zero, each zero is converted to a one, and finally 1 is added to the result in order to represent negative numbers. For example, the two's complement of 1001 is 0110+1=0111. If the operands are in two complement format, then sign correction must be performed as shown in FIG. 2 to perform a binary longhand multiplication.

In FIG. 2, S is the sign digit with S=0 for a positive operand and S=1 for a negative operand. The partial products that are accumulated are effectively sign extended to 16 bits and S(15) is the sign of the product. If the multiplier B is negative then B(7)=1 and the corresponding partial product should be subtracted rather than added. Rather than provide a special case for this last partial product so that it can be subtracted rather than added, an extra subtraction can be performed as shown in FIG. 2 of the A operand shifted to the MS digit and followed by zeros. This is possible because:

$$-27 = +27 - 28$$

As can be seen, longhand binary multiplication is conceptually quite simple. Unfortunately, it is costly when implemented due to the large amount of shifting and multiplexing required. One simplification technique has been proposed by A. Booth in "A Signed Binary Multiplication Technique", Quarterly Journal of Mechanics and Applied Mathematics, vol. IV, pt. 2, pp. 236-240 (1951). The Booth technique, shown in FIG. 3 and Table 1 for a two's complement 8×8 multiplication, allows the number of partial products to be reduced by a factor of two. Pairs of multiplier (B) bits are encoded into the signed digit set +2, +1, 0, −1, and −2 which multiply the sign extended multiplicand, A. A signed-digit-carry (SDC) is generated between each bit pair since the digit +3 is excluded from the set and passes between pairs of multilier bits. The digit +3 is expressed as the sum of an allowed digit and the SDC-out signal.

TABLE 1

| INPUTS | | | OUTPUTS | |
|---|---|---|---|---|
| B (2J+1) | B(2J) | SDC(2J) | MULTIPLIER | SDC(2J+2) |
| 0 | 0 | 0 | ×0 | 0 |
| 0 | 0 | 1 | ×(+1) | 0 |
| 0 | 1 | 0 | ×(+1) | 0 |

TABLE 1-continued

| INPUTS | | | OUTPUTS | |
|---|---|---|---|---|
| B (2J+1) | B(2J) | SDC(2J) | MULTIPLIER | SDC(2J+2) |
| 0 | 1 | 1 | ×(+2) | 0 |
| 1 | 0 | 0 | ×(−2) | 1 |
| 1 | 0 | 1 | ×(−1) | 1 |
| 1 | 1 | 0 | ×(−1) | 1 |
| 1 | 1 | 1 | ×0 | 1 |

A feature of the Booth set of signed digits as seen in Table 1, is that the SDC-out is independent of the SDC-in. Each resultant signed digit multiplies a left-shifted sign-extended mutliplicand and is accumulated. Sign correction for a negative multiplier, B(7)=1, is the same as described in the longhand multiplication, and an extra addition of this same left shifted A operand is necessary if there is a SDC-out from the last bit pair, SDC(8)=1, as seen in FIG. 3.

A simple example using the Booth encoding set of FIG. 3 and Table 1 is shown in Example 1 for multiplying the binary equivalents of 8×3.

EXAMPLE 1

```
8×3 = 24 (decimal)
A = 3 = 0000 0011 (binary)
B = 8 = 0000 1000 (binary)
         SDC(0) = 0           A = 0000 0000 0000 0011
B(0) = 0
B(1) = 0           ×0              0
         SDC(2) = 0
B(2) = 0
B(3) = 1           ×(−2)    1111 1111 1110 1000
         SDC(4) = 1
B(4) = 0
B(5) = 0           ×(+1)    0000 0000 0011 0000
         SDC(6) = 0
B(6) = 0
B(7) = 0           ×0              0
         SDC(8) = 0  1      0000 0000 0001 1000
                    over-              =24
                    flow            (decimal)
```

Note that SDC(0)=0 by definition and since the Booth set shown is for two's complement format, the multiplications by negative multipliers (−2 in Example 1) must be done in two's complement form. The overflow digit is ignored in determining the product since it can be made arbitrarily distant from the desired result by extending the sign of the partial products to any desired length.

The Booth encoding set thus facilitates the implementation of a binary multiplier by reducing the number of partial products by a factor of two with a resulting decrease by a factor of two in the number of adder cells which perform the partial product accumulation. Unfortunately, there is a disadvantage in the Booth technique—the encoding set has five members +2, +1, 0, −1, and −2. This means that when such a scheme is used to build a hardware multiplier the multiplexers (MUX) required to manipulate the signals as inputs to the adder cells must be 5-to-1 MUXs, which are usually implemented as 8-to-1 MUXs. The result is that the hardware improvements gained by encoding due to the factor of two reduction in adder cells can be lost due to the need for many large MUXs.

SUMMARY OF THE INVENTION

In accordance with the preferred embodiment of the present invention, a multiplier overcomes some of the difficulties heretofore encountered in using the Booth encoding method for combination multipliers by eliminating the need for an encoding set having five members.

The multiplier uses a novel encoding set containing only four members thus eliminating the need of 5-to-1 multiplexers to implement the encoded mutliplier and permitting the efficient use of 4-to-1 multiplexers in the adder array.

DETAILED DESCRIPTION OF THE DRAWINGS

FIG. 1 illustrates the multiplication of two 8 bit unsigned operands performed with the binary equivalent of longhand multiplication. Each shifted version of the A operand is accumulated as a partial product when the corresponding B operand bit is a 1.

FIG. 2 illustrates the two's complement multiplication of two 8 bit signed operands performed with the binary equivalent of longhand multiplication. Each shifted version of the A operand is sign extended to 16 bits and accumulated if the B bit is a 1. An additional subtraction is performed if the B operand is negative.

Figure 5A:
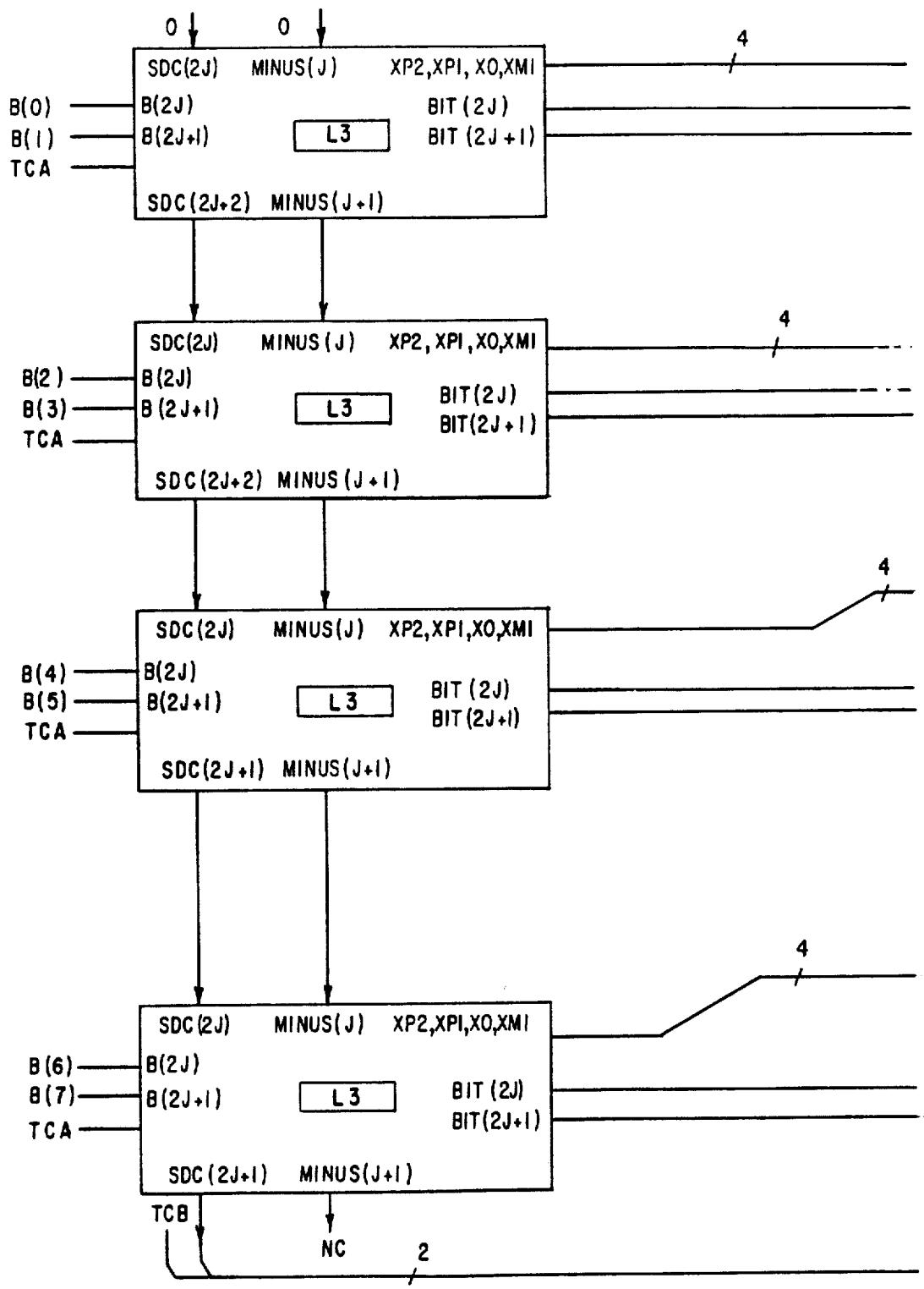
Figure 5B:
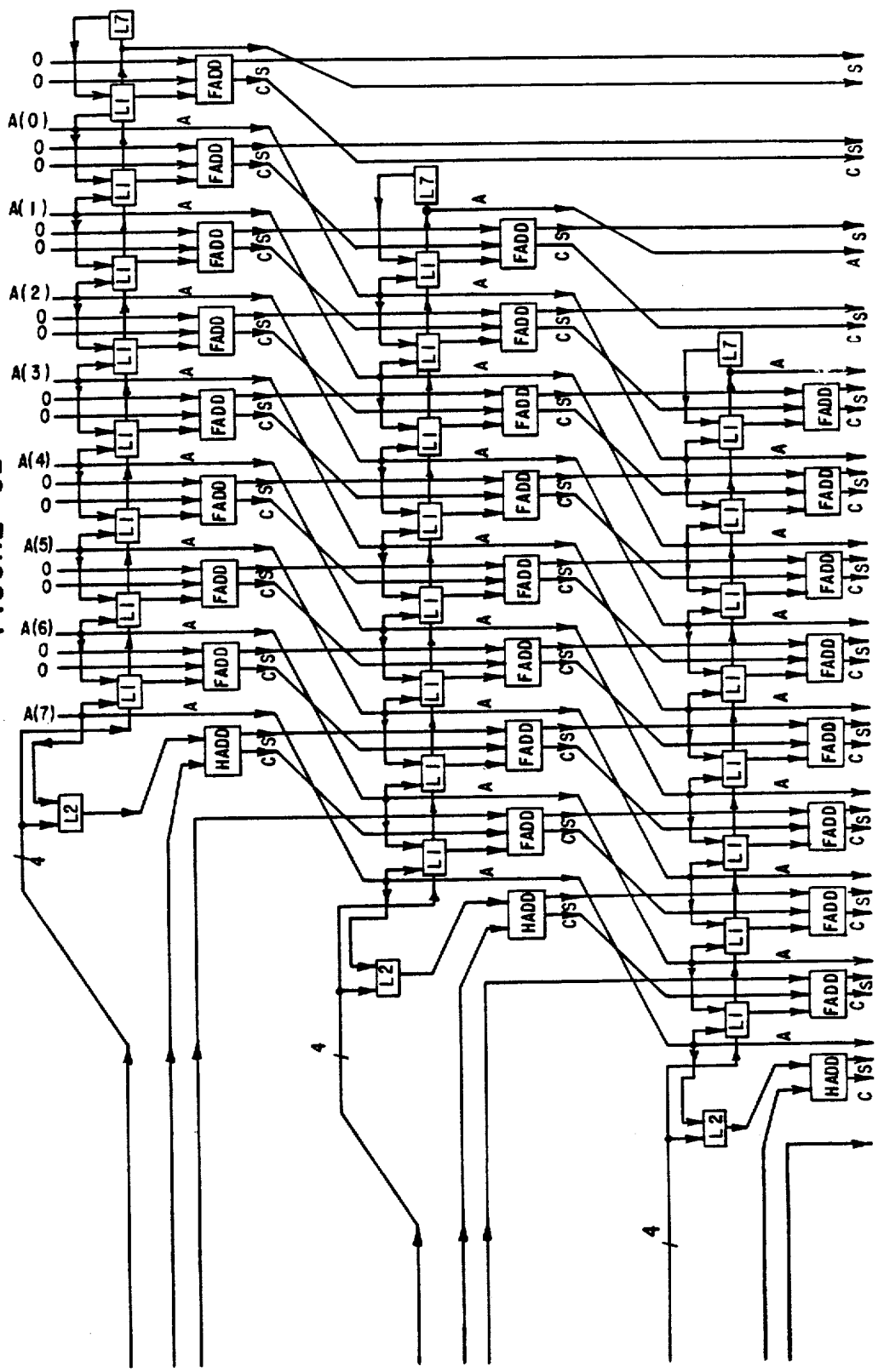
Figure 5C:
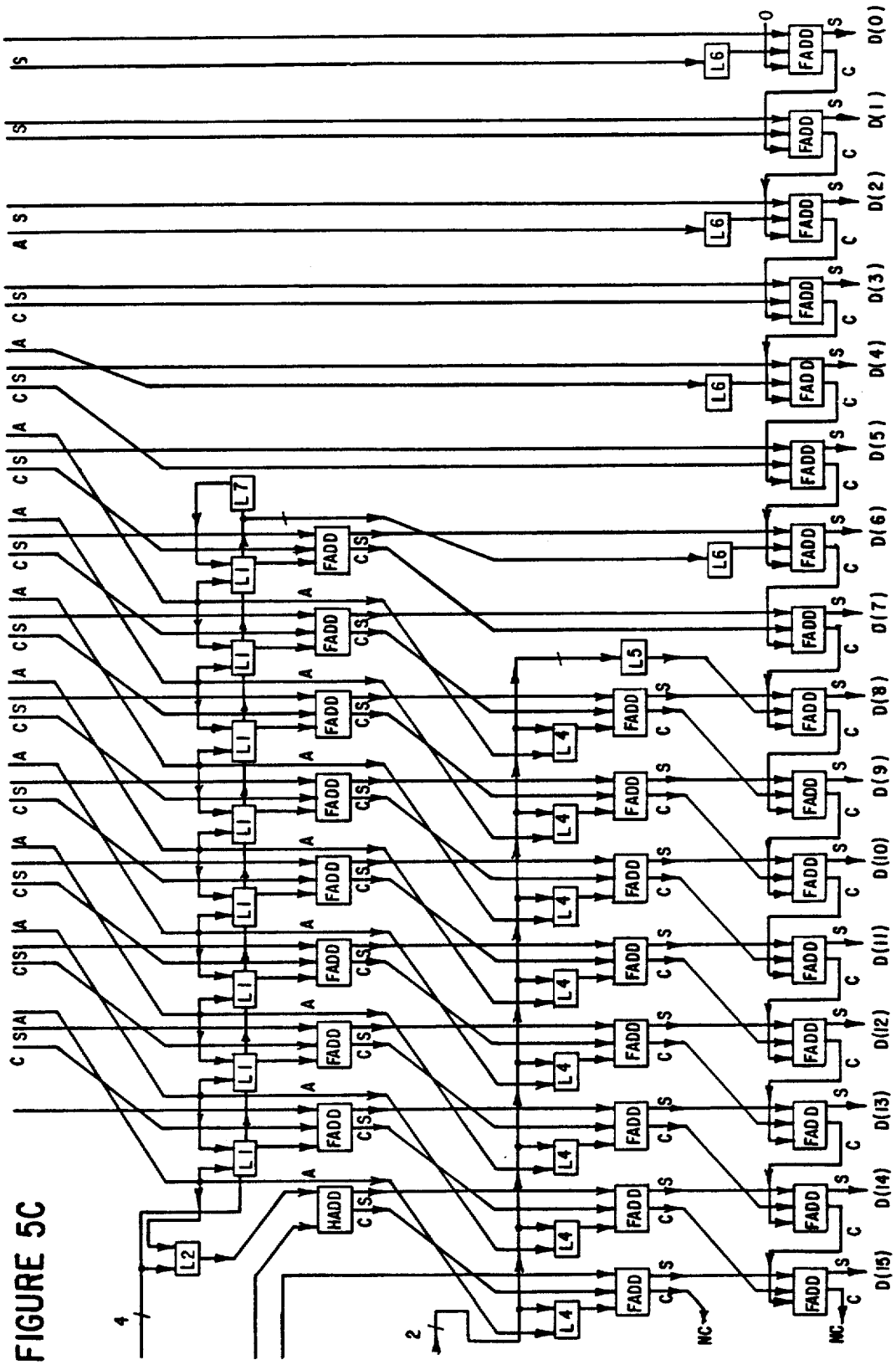

FIGS. 5', 5A, 5B and 5C are a complete encoded 8×8 multiplier implementing the claimed invention. Input operands are A(7-0) and B(7-0). Output result is D(15-0). TCA and TCB indicate whether the operands are in two's complement (=1) format or unsigned (=0).

Figure 6:
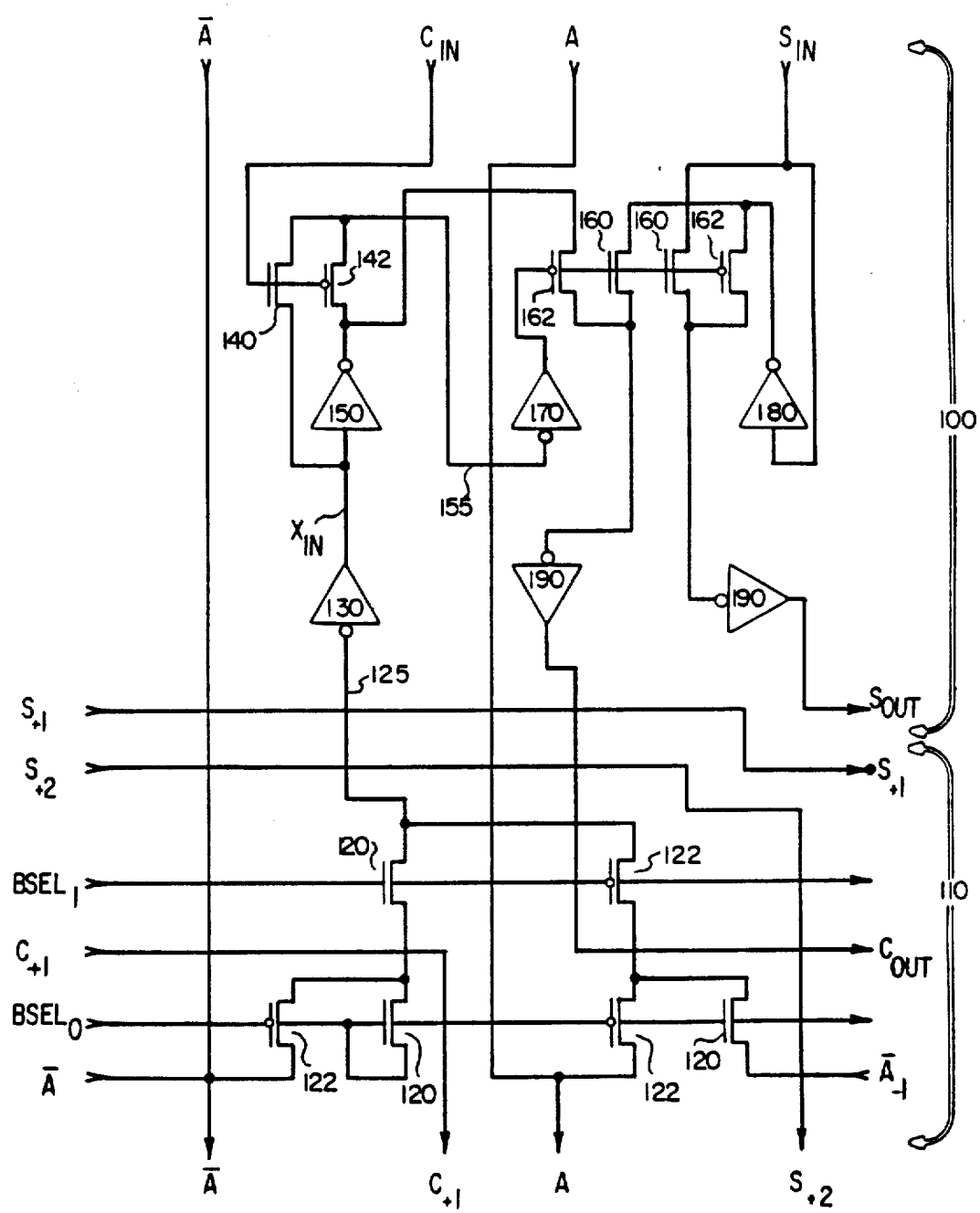

FIG. 6 is the schematic of a monolithic multiply cell for use in the present invention. It consists of a full adder (top) and a four-to-one multiplexer (bottom).

DETAILED DESCRIPTION OF THE INVENTION

The key requirement of any form of Booth encoding is that the sum of the weighted inputs must equal the sum of the weighted outputs. Referring again to Table 1, the SDC-in, SDC(2J), in the table has the same weight as the less significant bit of the bit pair B(2J). The more significant bit of the bit pair, B(2J+1), has twice this weight, as does the signed digit multiplier set. The SDC-out, SDC(2J+2), has four times the weight of B(2J). Thus, for each row of encoding, the three inputs with their corresponding weights must equal the two outputs with their corresponding weights. For example, line five of Table 1 satisfies the equality:

$$1x(2) + 0x(1) + 0x(1) = 1 \; x(-2) + 1x(4)$$

Figure 3:
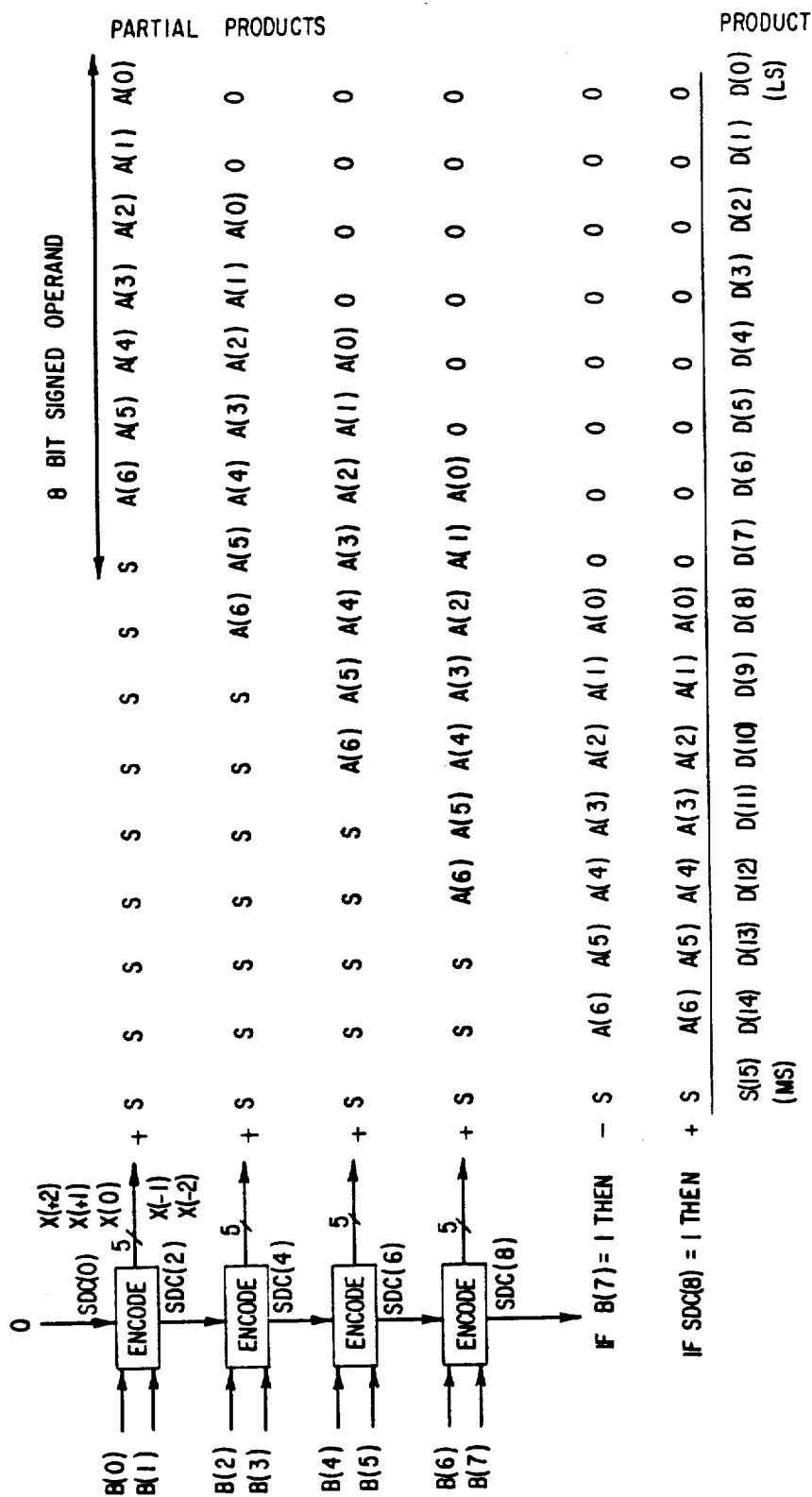
FIG. 3 shows the two's complement multiplication of two 8 bit signed operands performed with the prior art Booth encoding scheme. Additional corrections are shown if the final carry-out signal is a 1 and if the B operand is negative.
Figure 4:
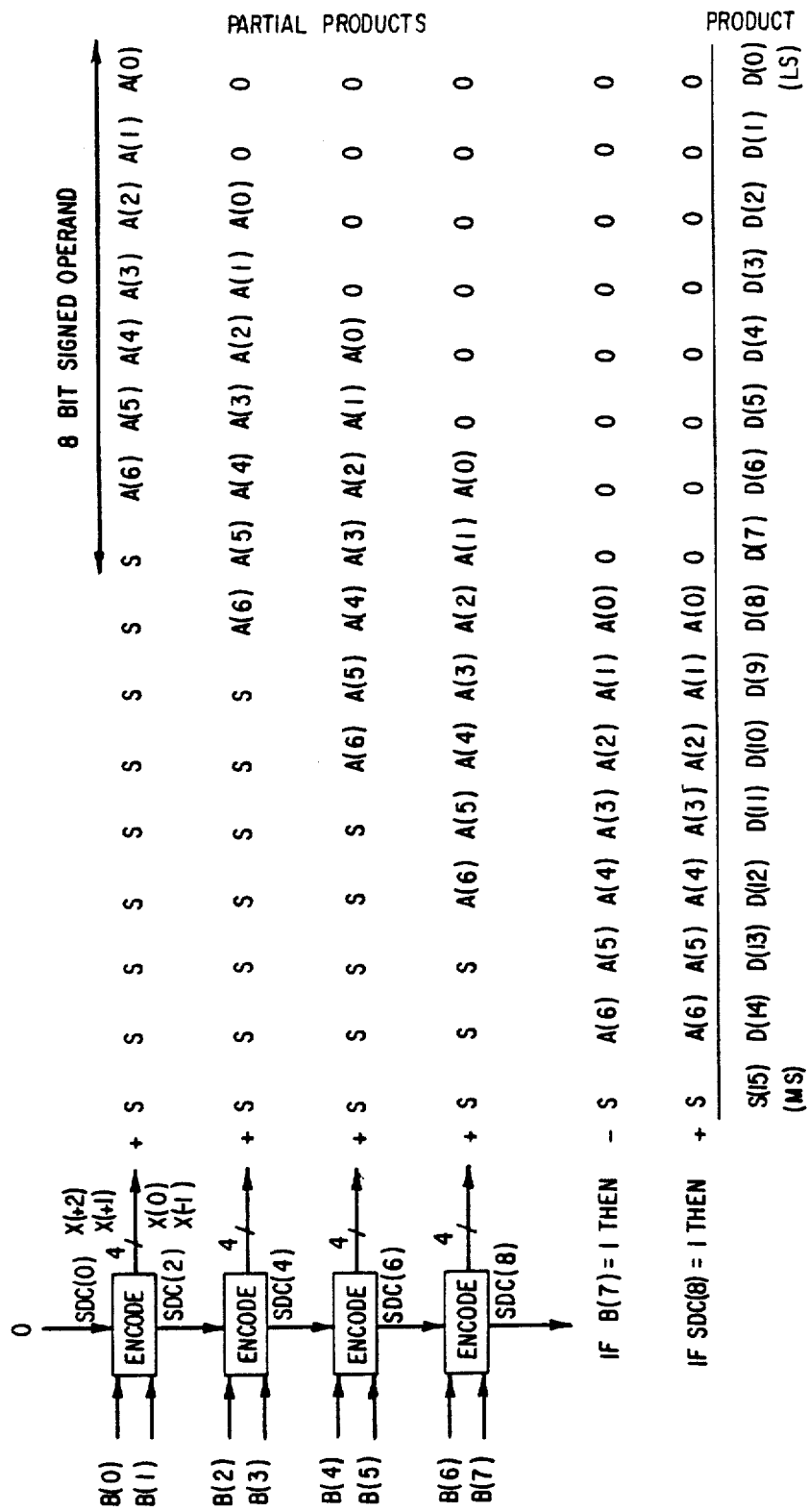
FIG. 4 shows the two's complement multiplication of two 8 bit signed operands performed according to the encoding scheme of the present invention.

The present invention makes use of this requirement to form a new and novel encoding scheme containing only four members shown for example in FIG. 4 and Table 2.

TABLE 2

| INPUTS | | | OUTPUTS | |
|---|---|---|---|---|
| B(2J+1) | B(2J) | SDC(2J) | MULTIPLIER | SDC(2J+2) |
| 0 | 0 | 0 | ×0 | 0 |
| 0 | 0 | 1 | ×(+1) | 0 |
| 0 | 1 | 0 | ×(+1) | 0 |

TABLE 2-continued

| INPUTS | | | OUTPUTS | |
|---|---|---|---|---|
| B(2J+1) | B(2J) | SDC(2J) | MULTIPLIER | SDC(2J+2) |
| 0 | 1 | 1 | ×(+2) | 0 |
| 1 | 0 | 0 | ×(+2) | 0 |
| 1 | 0 | 1 | ×(−1) | 1 |
| 1 | 1 | 0 | ×(−1) | 1 |
| 1 | 1 | 1 | ×0 | 1 |

The signed digit set of Table 2 has been reduced to four members +2, +1, 0, −1 by modifying line five of the truth table. The advantage of this technique is that no X(−2) version of the multiplicand needs to be generated in the array, allowing the efficient use of a 4-to-1 MUX to perform the encoding operation in each array cell. The apparent disadvantage of this new encoding scheme is that the SDC-out is now a function of the SDC-in, unlike the Booth scheme. It might be thought that this would impact the multiplier performance since the SDC must ripple down the multiplier bit pairs. Fortunately, since the partial products must themselves ripple down the rows of adders in the array as they accumulate, there is no performance penalty.

A simple example using the new encoding scheme is shown in Example 2. As in Example 1, Example 2 is also shown multiplying the binary equivalents of 8×3.

EXAMPLE 2

```
                 SDC(0) = 0           A =  0000 0000 0000 0011
B(0) = 0
B(1) = 0              ×0                        0
                 SDC(2) = 0
B(2) = 0
B(3) = 1              ×(+2)               0000 0000 0001 1000
                 SDC(4) = 0
B(4) = 0
B(5) = 0              ×0                        0
                 SDC(6) = 0
B(6) = 0
B(7) = 0              ×0                        0
                 SDC(8) = 0                0000 0000 0001 1000
                                                    = 24
                                                 (decimal)
```

A complete 8×8 encoded multiplier is shown in FIGS. 5', 5A, 5B and 5C along with a summary of Boolean equations for its logic blocks in Table 3 for the encoding in Table 2. The 8-bit operands are A(7-0) and B(7-0). The inputs TCA and TCB indicate whether the A and B operands are two's complement (=1) or unsigned (=0). The 16-bit result of the multiplication is D(15-0), and the FADD and HADD blocks are conventional full adders and half adders. The symbols XP1, XP2, and XM1 are used for the X(+1), X(+2), and X(−1) digits for clarity and "*" is the Boolean "AND", "+" is the Boolean "OR" and "XOR" is the Boolean "Exclusive OR".

In Table 3, logic block L1 consists of multiplexing logic to select X(+2), X(+1), X(0), or X(−1) multiples of the A operand. The multiples of B are generated in the array by simple shifting, complementing, or masking operations which is the reason for choosing those particular signed digits. The L2 block generates the lost bit that results from the single left shift used to generate an X(+2) multiple.

Logic block L3 incorporates the new signed digit encoding set of Table 2. Block L3 also performs an effective sign extension of each partial product to 16 bits. The signal Minus(J) indicates that at least one previous bit pair generated a negative partial product. This signal is combined with the signed digit multiplier of the bit pair to generate bit (2J) and bit (2J+1). These two signals are the effective sign extension for each partial product fully merged with the sign extensions of all previously generated partial products. Logic blocks L4 and L5 perform the correction for a negative B operand and for a signed digit carry out of the last multiplier bit pair. Blocks L6 and L7 perform the two's complement operation on the A operand for X(−1) signed digits.

TABLE 3

| L1 LOGIC | |
|---|---|
| L1(K,J) | = [XP2(J) * A(K−1)] + [XP1(J) * A(K)] + [XM1(J) * $\overline{A(K)}$] |
| L2 LOGIC | |
| L2(2J) | = [XP2(J) * A(7)] |
| L3 LOGIC | |
| NEGA | = TCA * A(7) |
| P | = [XP2(J) * NEGA] |
| Q | = [XM1(J) * $\overline{NEGA}$] + [XP1(J) * NEGA] |
| BIT(2J+1) | = [MINUS(J) XOR P] + [$\overline{MINUS(J)}$ * Q] |
| BIT(2J) | = MINUS(J) XOR Q |
| MINUS(J+1) | = MINUS(J) + P + Q |
| L4, L5, L6, L7 LOGIC | |
| NEGB | = TCB * B7 |
| L4(K) | = [NEGB XOR SDC(8)] * [NEGB XOR A(K)] |
| L5 | = NEGB * $\overline{SDC(8)}$ |
| L6(J) | = XM1(J) |
| L7(J) | = A(−1) = 0 |

The schematic for the array cell for the embodiment of the multiplier is shown in FIG. 6 for use with the new encoding scheme. It consists of a full adder 100 and a four-to-one MUX 110. An efficient four-to-one multiplexor 110 is used to select the X(+2), X(+1), X(0), or X(−1) version of the A operand, A, $\overline{A}$, $\overline{A}$−1, or BSEL$_0$. Because single sided transfer gates 120 and 122 are used (along with a level restoring inverter 130), only three NMOS devices 120, three PMOS devices 122, and two metal control lines, BSEL$_0$ and BSEL$_1$, are required. This compact circuit could not be used if the conventional recoding scheme with five signed digits were utilizied. The output 125 of the four-to-one multiplexor 110 is inverted by level restorer 130 forming X$_{in}$ for the adder 100. X$_{in}$ is exclusive OR'ed by NMOS device 140 and PMOS device 142 with the carry in C$_{in}$ from the above row, and this term 155 controls two two-to-one multiplexers comprised of two NMOS devices 160, two PMOS devices 162, level restorer 170, and inverter 180. Term 155 is further combined with the sum from the previous row, S$_{in}$, to produce the sum, S$_{out}$, and carry, C$_{out}$, for the current row via level restorers 190. The lines S$_{+1}$, S$_{+2}$ and C$_{+1}$ are the sum and carry signals from the next higher bits in the array which are merely passed through the array cell as part of the entire adder array. Thus, by using this new encoding scheme, the entire multiplier can be easily compacted by simple replication of the array cell of FIG. 6 and a minimum hardware implementation of a binary multiplier is made possible.

It is clear to one skilled in the art that other four member encoding schemes for combinational multipliers can be created using the foregoing technique without the exercise of the inventive faculty. Accordingly, the scope of this invention is defined by the scope of the following claims.

I claim:

1. An apparatus for multiplying first and second binary operands each having a nominal length of N bits where one of said bits of each operand may designate the sign of said operand comprising:

means for grouping pairs of bits of said first binary operand;

means for supplying a first carry-in signal which is a x;

means for encoding the first pair of bits of said first binary operand and said first carry-in signal into one member of a set of only four multiplier digits and a first carry-out signal;

means for passing the carry-out signal of one pair of bits of said first binary operand to the next subsequent pair of bits as the carry-in signal of said next subsequent pair of bits;

means for encoding said subsequent pairs of bits and said subsequent carry-in signals into a member of said set of only four multiplier digits and a further carry-out signal;

means for generating the partial products of said second binary operand and one of said four multiplier digits of said encoding set for each pair of bits of said first binary operand;

means for extending said sign bit of said partial products;

means for shifting said sign extended partial products by an amount equal to the weight of the less significant bit of the corresponding pair of bits of said first binary operand;

means for summing said shifted sign extended partial products; and means for shifting said second binary operand by an amount equal to the weight of the more significant bit of the most significant pair of bits of said first binary operand, and adding said shifted second binary operand to said sum of shifted sign extended partial products when the final carry-out signal is a 1.

2. An apparatus as in claim 1 when said first operand is negative further comprising:
   means for shifting said second binary operand by an amount equal to the weight of the more significant bit of said pairs of bits of said first binary operand; and
   means for substracting said shifted second binary operand from said sum of said shifted sign extended partial products.

3. An apparatus as in claim 1 wherein said four multiplier digits comprise the set of +2, +1, 0, and −1.

4. A method for multiplying first and second binary operands each having a nominal length of N bits where one of said bits of each operand may designate the sign of said operand comprising the steps of:
   grouping pairs of bits of said first binary operand;
   supplying a first carry-in signal which is a 0;
   encoding the first pair of bits of said first binary operand and said first carry-in signal into one member of a set of only four multiplier digits and a first carry-out signal;
   passing the carry-out signal of one pair of bits of said first binary operand to the next subsequent pair of bits as the carry-in signal of said next subsequent pair of bits;
   encoding said subsequent pairs of bits and said subsequent carry-in signals into a member of said set of only four multiplier digits and a further carry-out signal;
   generating the partial products of said second binary operand and one of said four multiplier digits of said encoding set for each pair of bits of said first binary operand;
   extending said sign bit of said partial products;
   shifting said sign extended partial products by an amount equal to the weight of the less significant bit of the corresponding pair of bits of said first binary operand;
   summing said shifted sign extended partial products; and
   shifting said second binary operand by an amount equal to the weight of the more significant bit of the most significant pair of bits of said first binary operand, and adding said shifted second binary operand to said sum of shifted sign extended partial products when the final carry out signal is a 1.

5. A method as in claim 4 when said first operand is negative further comprising the steps of:
   shifting said second binary operand by an amount equal to the weight of the more significant bit of said pairs of bits of said first binary operand; and
   subtracting said shifted second binary operand from said sum of said shifted sign extended partial products.

* * * * *

UNITED STATES PATENT AND TRADEMARK OFFICE
CERTIFICATE OF CORRECTION

PATENT NO. : 4,495,593
DATED : January 22, 1985
INVENTOR(S) : Frederick A. Ware

It is certified that error appears in the above—identified patent and that said Letters Patent is hereby corrected as shown below:

Column 1, line 43, "-27=+27-28" should read -- $-2^7=+2^7-2^8$ --.

Column 1, line 60, "multilier" should read -- multiplier --.

Column 6, line 40, "x" should read -- o --.

Column 7, line 11, "substracting" should read -- subtracting --.

Signed and Sealed this

Ninth Day of July 1985

[SEAL]

Attest:

DONALD J. QUIGG

Attesting Officer    Acting Commissioner of Patents and Trademarks